United States Patent [19]

Weibye

[11] 4,385,074
[45] May 24, 1983

[54] QUICK COOKING RICE AND PROCESS FOR MAKING THE SAME

[75] Inventor: Bjarne Weibye, Oslo, Norway

[73] Assignee: NS Apothekernes Laboratorium for Specialpraeparater, Oslo, Norway

[21] Appl. No.: 298,676

[22] Filed: Sep. 2, 1981

[51] Int. Cl.³ .......................... A23L 1/10; A23B 9/00
[52] U.S. Cl. ................................. 426/462; 426/508; 426/511; 426/618
[58] Field of Search ............... 426/462, 461, 507, 508, 426/511, 465, 618

[56] References Cited

U.S. PATENT DOCUMENTS

| | | |
|---|---|---|
| 2,195,165 | 3/1940 | Choppin et al. . |
| 2,438,939 | 4/1948 | Ozai-Durrani . |
| 2,525,137 | 10/1950 | Jones et al. . |
| 2,563,798 | 8/1951 | Burns et al. . |
| 2,610,124 | 9/1952 | Roberts . |
| 2,696,156 | 12/1954 | Campbell et al. . |
| 2,696,157 | 12/1954 | Campbell et al. . |
| 2,696,158 | 12/1954 | Shuman et al. . |
| 2,720,460 | 10/1955 | Flynn et al. . |
| 2,733,147 | 1/1956 | Ozai-Durrani . |
| 2,740,719 | 4/1956 | Ozai-Durrani . |
| 2,813,796 | 11/1957 | Kencaster et al. . |
| 2,828,209 | 3/1958 | Hollis . |
| 2,890,957 | 6/1959 | Seltzer . |
| 2,903,360 | 9/1959 | Seltzer . |
| 2,937,946 | 5/1960 | Ozai-Durrani . |
| 2,992,921 | 7/1961 | Bardet et al. . |
| 3,071,471 | 1/1963 | Gorozpe . |
| 3,083,102 | 3/1963 | Carcassonne-Leduc . |
| 3,133,818 | 5/1964 | Gould et al. . |
| 3,157,514 | 11/1964 | Gorozpe . |
| 3,164,475 | 1/1965 | Willock . |
| 3,189,461 | 6/1965 | Ozai-Durrani . |
| 3,189,462 | 6/1965 | Autrey et al. . |
| 3,408,202 | 10/1968 | Serbia et al. . |
| 3,432,309 | 3/1969 | Lynn et al. . |
| 3,694,226 | 9/1972 | Howland et al. . |
| 3,879,566 | 4/1975 | Cox et al. . |
| 3,959,515 | 5/1976 | McCabe . |
| 4,133,898 | 1/1979 | Carlson et al. . |
| 4,166,868 | 9/1979 | Ando et al. . |
| 4,233,327 | 11/1980 | Ando et al. . |

FOREIGN PATENT DOCUMENTS 107170 7/1965 Norway .
1092836 11/1967 United Kingdom .

OTHER PUBLICATIONS

*Rice Chemistry and Technology*, Edited by D. F. Houston, published by American Association of Cereal Chemists, Incorporated, St. Paul, MN.

Primary Examiner—Raymond N. Jones
Assistant Examiner—George C. Yeung
Attorney, Agent, or Firm—Seidel, Gonda, Goldhammer & Panitch

[57] ABSTRACT

A continuous process for producing quick cooking rice is provided herein. Such rice only requires approximately 5 minutes swelling time in hot, not boiling, water to prepare for consumption. The rice produced by this process is also high in nutrients in that very little removal of starch or other nutrients occurs, with consequent minimal water fouling. The process involves contacting rice, preferentially fissured rice produced by preheating, with water and steam such that the rice is completely gelatinized and has a moisture content up to about 70 weight percent. Such gelatinization is preferably accomplished by spraying the rice alternately and progressively with water and steam. The gelatinized rice, without stirring, is then dried to a final moisture content of between about 10 weight percent and 14 weight percent.

9 Claims, 2 Drawing Figures

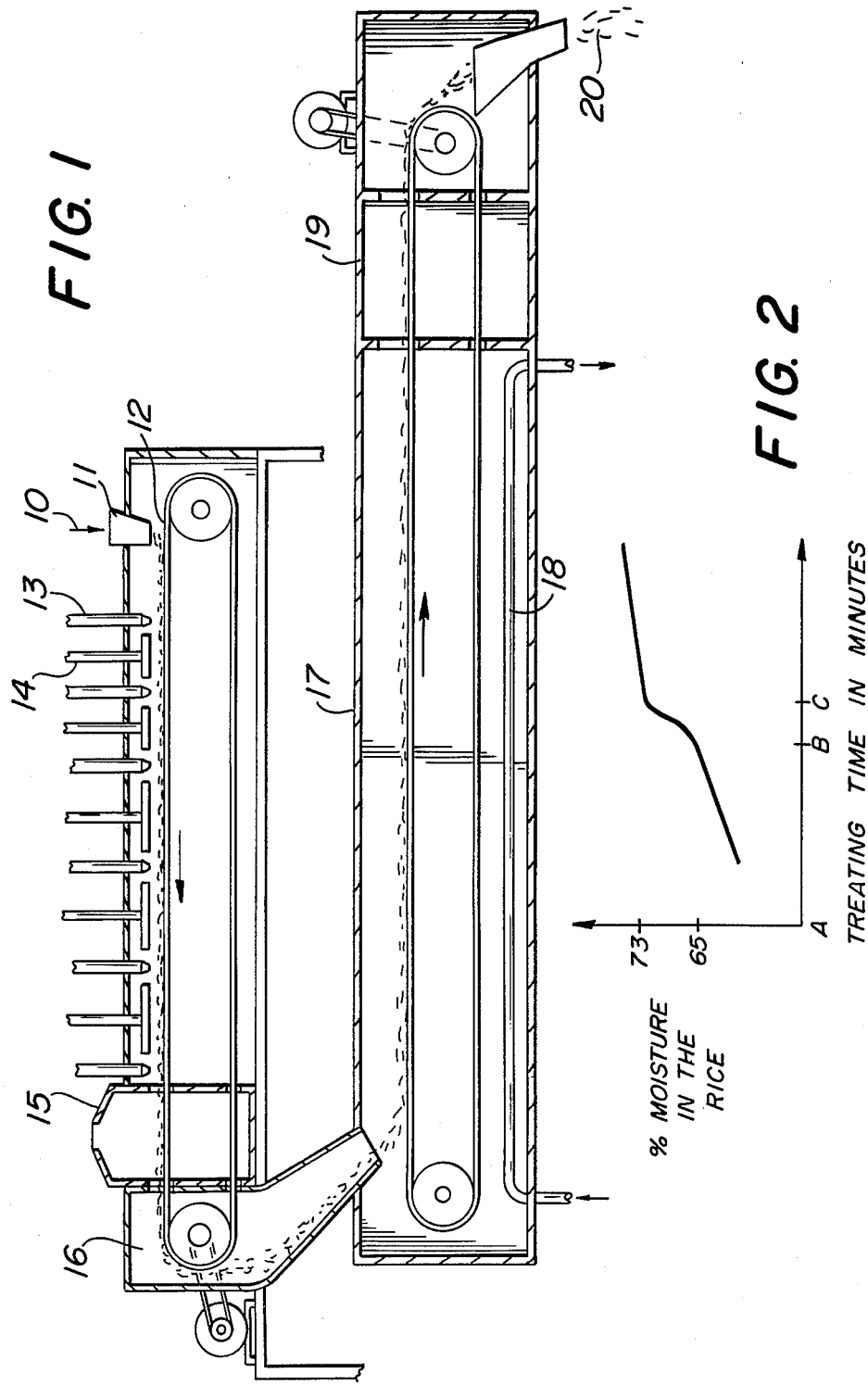

QUICK COOKING RICE AND PROCESS FOR MAKING THE SAME

BACKGROUND OF THE INVENTION

This invention relates to a continuous process for producing quick cooking (instant) rice which requires only about five minuts for swelling in hot, not necessarily boiling, water to be suitable for consumption, while retaining most of the nutritional value in the rice.

Standard milled white rice requires about 20 to 35 minutes of cooking in boiling water. In addition to the long cooking time required for the rice, the starch is sometimes not entirely gelatinized, or an undue number of the starch cells in the rice may burst to form a viscous, sticky, pasty cooked rice. For these reasons and others, the consumption of rice has been restricted for many years. Accordingly, considerable effort has been directed towards the production of quick cooking rice. Generally, quick cooking rice is rice that has been hydrated and/or gelatinized to various degrees and dried in such a manner to produce individual kernels.

An excellent discussion of quick cooking rice is given in *RICE CHEMISTRY AND TECHNOLOGY* edited by D. F. Houston, published by the American Association of Cereal Chemists, Incorporated, St. Paul, Minn., Chapter 15, *Quick Cooking Rice*, Robert L. Roberts, pages 381–399, the entire contents of which are incorporated by reference herein.

Generally most prior art methods of making quick cooking rice involve soaking the rice in water. For example, see U.S. Pat. Nos. 2,438,939; 2,733,147; 2,740,719; and 2,828,209. The soaking technique, however, is time consuming, involves a loss of valuable rice starch and produces a waste water pollution problem. Soaking involves the use of excess water which invariably leads to a dissolving of rice starch into the water which not only lowers the nutritional value of the rice (loss of carbohydrates and calories), but also results in the production of a starchy water effluent which must be disposed.

Another technique used in producing quick cooking rice is to fissure the rice and such method is disclosed in various patents including U.S. Pat. Nos. 3,157,514 and Norwegian Pat. No. 107,170. U.S. Pat. No. 3,157,514 suffers from the fact that it specifically requires hydrated rice to be used as a raw starting material. Further, U.S. Pat. No. 3,157,514 involves the soaking technique and cooling the rice before drying (a very energy wasteful step). The rice product of U.S. Pat. No. 3,157,514 is not completely gelatinized and thus requires boiling to render the rice suitable for consumption. The rice produced by the method of Norwegian Pat. No. 107,170 is also not completely gelatinized and thus requires boiling in water before consumption.

Still another process to produce quick cooking rice is given in U.S. Pat. No. 2,937,946 which discloses the use of spraying with hot water to gelatinize the rice. This technique requires large amounts of hot water and is thus very energy consuming. Also, the process of U.S. Pat. No. 2,937,946 involves a great deal of time to achieve gelatinization.

DEFINITIONS

"Gelatinization" of rice as referred to herein concerns the condition of the rice after it has been treated at a certain temperature in a sufficient amount of moisture such that the starchy component of the rice is softened, structurally broken down and converted in such a manner that the rice swells in hot water.

"Completely gelatinized" as referred to herein concerns the condition of the rice when all the starchy material in the rice is completely softened and all of the starch content in the rice is converted. Rice that is completely gelatinized will generally not yield crispy fragments when cooked by soaking in hot water.

"Moisture content" of rice as referred to herein and expressed as a weight percentage is the weight percent of moisture with respect to the total weight of the dry rice plus the weight of moisture contained in the rice.

"Water" as referred to herein is water in the liquid phase and does not include water in the gaseous phase, i.e., steam.

"Dry steam" or "steam" as referred to herein is steam which does not contain any particles of moisture. The dry steam or steam will experience a rise in temperature when exposed to an increase in heat.

"Wet steam" as referred to herein is steam which contains moisture.

SUMMARY OF THE INVENTION

There has now been discovered a process to prepare a quick cooking rice product in which most of the carbohydrate and nutritional value is retained and in which the rice kernels are generally whole grain and not broken. Depending on the nature of the rice utilized, the rice product made by this new process will have a starch content which is 15% to 20% higher than a corresponding rice product made by conventional batch processes. The rice prepared by this novel process can be cooked in about five minutes by swelling in hot water. The novel process of this invention is also economical, saves energy, saves time, and produces a minimum of starchy pollutant effluents. This process can also be conducted in a closed chamber, thus avoiding undue contamination of the area in which the rice is processed.

The continuous process of the present invention involves the spraying of rice with water and steam, such that the rice is completely gelatinized and attains a moisture content of between about 24 weight percent and about 78 weight percent with a resultant temperature for the gelatinized rice of between about 79° C. and about 100° C. The gelatinized rice is then dried to attain a final moisture content of between about 10 weight percent and about 14 weight percent, with the rice not being agitated to the extent where the rice forms a sticky mass.

The spraying of the rice can be accomplished by using alternate separate sprays of water and steam, or with wet steam.

For the purpose of illustrating the invention, there is shown in the drawings a form which is presently preferred; it being understood, however, that this invention is not limited to the precise arrangements and instrumentalities shown.

BRIEF DESCRIPTION OF THE DRAWINGS

FIG. 1 is a schematic diagram of an exemplary embodiment of an apparatus for conducting the continuous quick cooking rice process of the present invention.

FIG. 2 is a plot of treating time to obtain complete gelatinization of the rice as a function of the weight percentage of moisture in the rice.

DETAILED DESCRIPTION OF THE INVENTION

The rice that can be used in the present process is dehulled rice. Non-limiting examples of rice that can be utilized in this process include white rice, brown rice, long grain rice, medium grain rice, short grain rice and parboiled rice.

Although untreated rice can be utilized in the process of this invention, i.e., ordinary dehulled unpreheated rice, it is preferable to use fissured (finely cracked) rice grains. Without wishing to be bound by any particular theory of operability, it is believed that fissuring or causing fine cracks in the rice causes liquid to penetrate the grains quickly. The preferred method of obtaining this fissuring is by preheating the rice. This preheating is preferentially done in a hot gas, for example, air, oxygen, nitrogen, etc. The extent of preheating to achieve fissuring depends on the rice quality, for example, its starch content. The appropriate amount of preheating to achieve fissuring is empirical and must be determined experimentally. Generally, the temperature of preheating is between about 110° C. and about 150° C., and preferentially, between about 130° C. and about 140° C. The duration of preheat is between about 10 minutes and about 15 minutes, and preferentially between about 11 minutes and about 13 minutes.

The rice, either untreated or preheated, is completely gelatinized and a certain predetermined moisture content is imparted thereto by intermittently spraying the rice with water and steam. If preheated rice is used, such rice is sprayed while it is still hot. A controlled amount of water and steam is utilized during spraying in order to attain a moisture content of between about 24 weight percent and about 78 weight percent with a resultant temperature for the completely gelatinized rice of between about 79° C. and about 100° C. It is preferred to achieve a moisture content of between about 52 weight percent and about 73 weight percent and more preferably to achieve a moisture content of between about 68 weight percent and about 71 weight percent. It is also preferred to attain a resultant temperature of the gelatinized rice of between about 87° C. and about 95° C., most preferably between about 90° C. and about 93° C.

The spraying of water and steam onto the rice can be performed using wet steam or with one or more cycles of sprays of water and steam (a cycle consists of one spray of water and one spray of steam) either alternately or simultaneously, with alternate spraying preferred. Each individual spray of water lasts between about 5 seconds and 40 seconds, preferably between about 10 seconds and 40 seconds. The temperature of the water utilized is not crucial (it may be hot or cold) and can be ambient, for example, between about 10° C. and 20° C. Water such as tap water, distilled water, etc. can be utilized. Also, both hard and soft water can be employed. The number of cycles of sprays utilized may be between about 3 and 7. The actual number of cycles of sprays will depend upon the starch content of the rice. Italian rice, for example, has a starch content of between about 85 weight percent and about 87 weight percent and preferably is treated in 5 cycles. American rice, on the other hand, has a starch content of 87 weight percent to 90 weight percent and preferably is treated in 6 cycles or in 5 cycles with extended spraying and steaming.

The steam utilized will have a pressure of between about 3.8 kg/cm$^2$ and about 6 kg/cm$^2$, with a corresponding temperature of between about 135° C. and about 160° C. Each individual spray of steam lasts between about 0.5 minute and 4 minutes, preferably between about 1 minute and about 3 minutes.

A typical scheme for spraying water and steam is as follows: First, water is sprayed onto the rice for between about 10 seconds and about 30 seconds (such as about 15 seconds), followed by a steam spray for about 0.25 minute and about 3 minutes (such as about 2 minutes). This cycle for spraying water and steam onto the rice is repeated up to about 7 cycles, depending on the type of rice utilized, the duration of the sprays, the temperature of the sprays, etc. until the rice is substantially completely gelatinized.

The total contact time during the intermittent spraying of the rice with the steam and water is approximately between about 2 minutes and 26 minutes, preferably between about 2 minutes and 20 minutes, and more preferably between about 3 minutes and 17 minutes. It is preferred to carry out the spraying of the rice with water and steam wherein the rice is on a moving perforated bed or belt and the sprays can contact the rice from either above or below the rice, or both above and below the rice. It is preferred that a rice layer on the belt or bed be between about 3 millimeters and 10 millimeters, and more preferably between about 5 millimeters and 7 millimeters in depth. The spraying can be conducted in a closed chamber to avoid contamination.

The rice may also be sprayed by using alternate pulses of water, steam and heat. In this instance, the rice would be alternately sprayed with water and steam, then heated, then sprayed with water and steam, then heated, and so on for a number of cycles of water-steam spraying and heating.

Gelatinization may be carried out to completion while the rice is being sprayed. In rare instances, gelatinization may extend to completion to a small extent in a subsequent drying operation. However, it is preferred and contemplated that all of the gelatinization occur during spraying.

The total amount of moisture imparted to the rice depends on several variables including the nature of the rice, the pressure and temperature of the steam, the temperature of the water, the time of treatment (contact time) and the weight and surface area of the rice being contacted. The time for obtaining complete gelatinization depends, among other variables, on the rice quality.

Steam treating time during spraying is dependent upon the depth of the rice layer being contacted. The less the depth, the less treating time required. It must be noted that during steaming, the depth may increase due to swelling. The temperature of the steam used in spraying can be between about 135° C. and 160° C.

After the spraying with water and steam, with the rice now being completely gelatinized and having a moisture content of between about 24 weight percent and 78 weight percent, such as approximately 70 weight percent, and at a temperature of between about 79° C. and about 100° C., such as approximately 90° C., the rice while still hot, is dried, such as by transferring the rice on a moving bed to a drying section. It is important that when the rice is handled between the spraying and drying steps that the rice not be stirred or agitated in order to prevent a sticky mass from being formed. During the drying step, the gelatinized rice is reduced to a final moisture content of between about 10 weight percent and about 14 weight percent.

It is preferred that the drying be carried out in two steps, a predrying step in which the moisture content is reduced to between about 25 weight percent and about 35 weight percent and a final drying step in which the moisture content is reduced to between about 10 weight percent and about 14 weight percent. Thus, a predrying section could be operated at a temperature between about 100° C. and about 140° C. with a duration of drying of between about 2 minutes and about 3 minutes. The final drying section could be operated at a temperature of between about 50° C. and about 70° C. and for a duration of drying of between about 20 minutes and about 30 minutes. Such drying can be carried out in any convenient manner such as in a drying tunnel. Methods to conduct this drying include the use of hot air, indirect heat exchangers (steam heat exchangers), microwaves, electric resistance heating, fired heaters, etc. During drying, case hardening of the rice grains must be prevented. After drying, the finished quick cooking rice is then ready to be sent for packing or storage.

Now referring to FIG. 1 in detail, unpreheated or preheated, fissured raw rice schematically represented by arrow 10, enters a raw rice hopper 11 and is deposited onto a perforated stainless steel conveyor belt 12. While moving on the conveyor belt, the rice is alternately contacted with water from sprayers 13 and steam from sprayers 14. Although FIG. 1 schematically illustrates the water and steam as contacting the rice from above the bed, the water and steam sprays may be located below and above the moving rice bed. After being contacted with water and steam, the rice then moves into a predryer 15. After being predried, the rice is passed through a gelatinized rice hopper 16 into a drying tunnel 17. Although not so illustrated, the drying tunnel may include several drying sections with each section heated by a source of heat, such as by an indirect heat exchanger 18. The last section of the drying tunnel 17 is a cooling section 19. The rice is discharged from the cooling section 19 at outlet 20. The finished quick cooking rice is then ready to be transported for packing and/or storage.

The present invention is very advantageous in that a superior quick cooking rice product is obtained by the novel process of this invention. The rice product so obtained does not require conventional cooking in boiling water to be suitable for consumption. The rice produced by this process requires only a few minutes swelling time in hot water before it can be served. Furthermore, the rice obtained by the present process is a richer product than that obtained by prior art processes in that most of the rice's fatty materials and starches are retained in the rice and not lost during processing. Also the rice product of this process has a very low percentage of unattractive broken grains.

As compared to prior art instant rice processes, the process of the present invention has the advantages of consuming less time, energy and labor. Also, this process is less polluting than conventional processes and more economical to operate.

The invention will now be described in greater detail by reference to the following specific, non-limiting examples.

EXAMPLES 1-3

A layer of rice supported on a perforated steel bottom of an uninsulated chamber was contacted with wet steam. Such wet steam was sprayed through orifices located both above and beneath the rice bed.

After the rice was sprayed with wet steam, the rice was dried by predrying the hot material at 120° C. for 1-2 minutes. The rice was then gently turned and afterdried at 60°-65° C. for about 10-30 minutes. To prevent formation of a sticky mass, excess water had to be quickly removed. To accomplish such drying, high velocity air at about 100 meters/minute was employed. Conditions for Examples 1-3 are given in Table 1 hereinafter. The results for Examples 1-3 were good. In each example, the rice was completely gelatinized.

Determination of the water content of the finished dry rice product was accomplished by using a Sauter balance with an infrared lamp located above the balance pan in a manner well known to those skilled in the art. A 10 gram sample of the rice was measured on the balance and then the lamp was turned on for a period of about 10 minutes. After the 10 minute period, the sample was reweighed and the difference in weight represented the loss of water.

TABLE 1

| Ex. No. | Area of Treatment, m² | Steam Pressure, kg/cm² | Rice Utilized Type | Rice Utilized Amount, kg | Rate of Water Mixed With The Steam, liter/min. | Total Duration of Steaming, min. | Temp. of Channel, °C. | Amount of Moisture Imparted To the Rice, liters |
|---|---|---|---|---|---|---|---|---|
| 1 | 0.19 | 5 | 3 min. rice* | 0.8 | 0.25 | 4 | 92 | 1.0* |
| 2 | 0.19 | 5 | parboiled | 1.1 | 0.25 | 10 | 90 | 2.5** |
| 3 | 0.30 | 3.8 | 3 min. rice* | 1.2 | via top orifice: 5 via bottom orifice: 10 | 6 | 93 | 30** |

*"3 min" or "10 min" rice referred to in this Table and elsewhere herein means rice that is heated so it requires 3 minutes (or 10 minutes) boiling time for consumption.
**Not including some condensed water from the steam

EXAMPLES 4-15

A pilot apparatus similar in principle to the process equipment depicted in FIG. 1 was utilized in Examples 4-15. In these Examples 4-15, separate sprays of water and steam were sprayed alternately and progressively from separate orifices onto the rice.

In Examples 5-9, the gelatinized rice before drying was found to have a moisture content of between about 65 and 70 weight percent. In Examples 10-12, the moisture content in the rice after gelatinization varied between 62% and 70%. In Examples 13-15, the moisture content in the rice after gelatinization varied between 63% and 70%. Gelatinization conditions for Examples 4-15 are given in Table 2 hereinafter. Table 3 hereinafter gives the predrying and afterdrying conditions and results for Examples 4–15.

In the last three examples, Examples 13–15, untreated rice was used as a starting material, i.e., ordinary, dehulled white rice which was not preheated. Examples 13–15 clearly show that the process of this invention also works well with this type of material, but the process time is longer and the loss of starchy material is greater.

The time for obtaining complete gelatinization, in fact, depends on the rice quality, among other variables. Referring to FIG. 2, which is a plot of treating time to achieve complete gelatinization as a function of the weight percentage of moisture in the rice, the time required from point A to point B and from point B to point C, providing a constant temperature of between about 90° C. and about 93° C. is maintained, can be stated as follows:

| Rice quality | A to B (approximate time in minutes) | B to C (approximate time in minutes) |
| --- | --- | --- |
| Untreated rice | 11 | 2–3 |
| 3 minute rice | 3 | 1 |
| 10 minute rice | 6 | 1 |
| Parboiled rice | 11 | 1 |

If the treating time is extended beyond point C, the rice will be destroyed, thus losing its form and consistency.

The steam treating time is also dependent on the depth of the rice layer on the perforated bed. In the Examples, the depth was 5 mm, which increased to 25 mm during the gelatinization process. This was due to the swelling of the rice grains.

Although rice of any quality may be used in the novel process of this invention, the best results were achieved by using 3 minute rice, since the steam quickly penetrated the outer layer and started the gelatinization in the interior of the rice grain. 3 minute rice also required the shortest steaming time. The most chewy and temperature stable product, however, was obtained by using ordinary dehulled, white long grain rice which was not preheated.

TABLE 2

| Example No. | Area of Treatment, m² | Steam Pressure, kg/cm² | Rice Utilized Type | Rice Utilized Amount, kg | Rate of water Utilized, liters/min. | Water Sprays No. of Sprays | Water Sprays Duration of Each Spray min. | Water Sprays Total Duration of Spraying, min. | Steam Sprays No. of Sprays | Steam Sprays Duration of Each Spray, min. | Steam Sprays Total Duration of Spraying, min. | Temp. of Channel °C. | Gelatinization |
| --- | --- | --- | --- | --- | --- | --- | --- | --- | --- | --- | --- | --- | --- |
| 4* | 0.3 | 3.8 | 3 min. rice | 3.0 | 5 | 5 | ½ | 2½ | 5 | 1 | 5 | 94 | Not completely gelatinized, some crispy fragments |
| 5 | 0.3 | 4.0 | 3 min. rice | 3.0 | 4.8 | 5 | ¼ | 1¼ | 2 / 3 | 1 / 2 | 8 | 98–100 | Very Good |
| 6 | 0.3 | 4.0 | 3 min. rcie | 3.0 | 4.8 | 5 | ¼ | 1¼ | 2 / 3 | 1 / 2 | 8 | 98–100 | Very Good |
| 7 | 0.3 | 4.0 | 3 min. rice | 3.0 | 4.8 | 5 | ¼ | 1¼ | 2 / 3 | 1 / 2 | 8 | 98–100 | Satisfactory |
| 8 | 0.3 | 4.0 | 3 min. rice | 3.0 | 4.8 | 5 | ¼ | 1¼ | 2 / 3 | 1 / 2** | 8 | 98–100 | Satisfactory |
| 9 | 0.3 | 4.0 | 3 min. rice | 3.0 | 4.8 | 6 | ¼ | 1½ | 2 / 4 | 1 / 2 | 10 | 98–100 | Gelatinization seemed to go too far |
| 10 | 0.3 | 4.0 | 10 min. rice | 3.0 | 4.8 | 7 | ¼ | 1¾ | 2 / 5 | 1 / 2 | 12 | 98–100 | Good (5 sequences were not sufficient) |
| 11 | 0.3 | 4.0 | 10 min. rice | 3.0 | 4.8 | 5 | ¼ | 1¼ | 2 / 3 | 1.25 / 2.5 | 10 | 98–100 | Satisfactory |
| 12 | 0.3 | 4.0 | 10 min. rice | 3.0 | 4.8 | 5 | ¼ | 1¼ | 2 / 3 | 1.25 / 2.5 | 10 | 70–85 | Not satisfactory - trouble with the steam |
| 13 | 0.3 | 4.0 | untreated rice | 3.0 | 4.8 | 6 | ¼ | 1½ | 2 / 4 | 1.25 / 2.5 | 12.5 | 98–100 | Rice was hard after 5 sequences - |
| 14 | 0.3 | 4.0 | untreated rice | 3.0 | 4.8 | 6 | ¼ | 1½ | | | | | |
| 15 | 0.3 | 4.0 | untreated rice | 3.0 | 4.8 | 6 | ¼ | 1½ | | | | | |

TABLE 2-continued

| | | | | | gelatinization was satisfactory after an additional sequence |
|---|---|---|---|---|---|
| 14 | 2 | 1.25 | 12.5 | 98–100 | Satisfactory |
|  | 4 | 2.5 |  |  |  |
| 15 | 2 | 1.5 | 15 | 98–100 | Satisfactory |
|  | 4 | 3 |  |  |  |

*Amount of water added to the rice was 12.5 liters, not including some condensed water from the steam.
**Rice was sprayed with cold water immediately after the last steaming - cold water had no effect on gelatinization.

TABLE 3

| Ex. No. | Pre-Drying Conditions | | | After Drying Conditions | | | Results |
|---|---|---|---|---|---|---|---|
| | Air Velocity, m/min. | Temp. °C. | Duration, min. | Air Velocity, m/min. | Temp. °C. | Duration, min. | |
| 4 | 125 | 114 | 4 | 90 | 55 | 21 | Good results were obtained |
| 5 | 125 | 110 | 1½ | 90 | 53 | 25 | Case hardening had occurred and the grains had a hard shell with a soft kernel. |
| 6 | 125 | 100 | 2½ | 90 | 55 | 25 | The product was not perfectly dry. |
| 7 | 125 | 100 | 2½ | 90 | 55 | 25 | Very good. The rice agglomerates could be broken apart into separate grains very easily. A sample was prepared by swelling in hot water for 5 minutes. The rice was well cooked and the consistency was nice and soft without any hard fragments in the grains. |
| 8 | 125 | 100 | 3 | 90 | 70 | 25 | Very good. Exactly the same result as in Example No. 7. |
| 9 | 125 | 110 | 3 | 90 | 70 | 25 | The product was satisfactorily dried and the agglomerates were easily broken apart into separate grains. A sample which was prepared for eating by swelling in hot water was too soft. The gelatinization process had gone too far. |
| 10 | 125* | 115 | 3 | 90 | 70 | 25 | The product was not satisfactorily dried and the drying had to continue for another 3 minutes. Still, the product was not as dry as desired and it was almost completely impossible to break up the agglomerates. |
| 11 | 125 | 108 | 3 | 90 | 70 | 25 | Very good. The rice agglomerates could easily be broken apart to single grains. A sample was prepared for eating by swelling in hot water for 5 minutes. The grains had a firm and nice consistency without any hard zones and were more chewy than that from "3 minute rice". This is the way this kind of rice should be. |
| 12 | 125 | 110 | 2 | 90 | 70 | 26 | The product was satisfactorily dry but the grains had crispy zones because of unsatisfactory gelatinization. |
| 13 | 125 | 110 | 2 | 90 | 70 | 26 | Although the product was not perfectly dry, the result was promising. |
| 14 | 125 | 120 | 2 | 90 | 70 | 30 | The product was sufficiently dry and the rice agglomerates could easily be broken apart. A sample was prepared for eating by swelling the rice in hot water for 5 minutes. The grains had some crispy zones which indicated that the gelatinization process was not completed. |
| 15 | 125 | 108 | 2 | 90 | 70 | 30 | The product was satisfactorily dry and the aggolomerates could quite easily be broken up. A sample was prepared for eating by swelling in hot water for 5 minutes. The rice was firm and nice and probably still more chewy than that from the "10 minute rice". The result was very good. |

*Rice was sprayed with water before drying

The present invention may be embodied in other specific forms without departing from the spirit or essential attributes thereof and, accordingly, reference should be made to the appended claims, rather than to the foregoing specification, as indicating the scope of the invention.

I claim:

1. A continuous process for producing a quick cooking rice consisting essentially of the following steps:
    (a) placing a layer of rice at a depth of about 3 mm to about 10 mm on a perforated conveyor belt within a closed chamber;
    (b) spraying the rice as it moves on the conveyor belt with alternate intermittent sprays of water and steam a sufficient number of times to substantially completely gelatinize the rice so as to have a moisture content of about 52 weight percent to about 73 weight percent and a temperature of about 87° C. to about 95° C., each water spray having a duration of about 5 seconds to about 40 seconds, each steam spray having a duration of about 0.5 minute to about 4 minutes, the steam being at a pressure of about 3.8 kg/cm² to about 6 kg/cm² and at a temperature of about 135° C. to about 160° C.;
    (c) transferring the gelatinized rice while it moves on the conveyor belt without agitation to a predrying section within the chamber;
    (d) predrying the gelatinized rice to a moisture content of about 25 weight percent to about 35 weight percent by passing it through the predrying section having a temperature of about 100° C. to about 140° C. for a duration of about 2 to about 3 minutes; and (e) finally drying the predried rice to a moisture content of about 10 to about 14 weight percent by passing the predried rice through a final drying section within the chamber heated to a temperature of about 50° C. to about 70° C. for a duration of about 20 minutes to about 30 minutes, the rice so produced being suitable for consumption after swelling in hot, rather than boiling water for about 5 minutes.

2. The process of claim 1 further comprising fissuring said rice prior to said spraying.

3. The process of claim 2 wherein said rice fissuring includes heating said rice prior to said spraying at a temperature between about 110° C. and about 150° C. for a period of time between about 10 minutes and about 15 minutes.

4. The process of claim 1 wherein said intermittent spraying with both water and steam with the rice is conducted for a total duration of between about 2 minutes and about 26 minutes.

5. The process of claim 1 wherein said moisture content of said gelatinized rice prior to drying is between about 68 weight percent and 71 weight percent.

6. The process of claim 1 wherein the temperature of said gelatinized rice prior to drying is between about 90° C. and about 93° C.

7. The process of claim 1 wherein the predrying step (d) comprises the blowing of heated air on the rice at a velocity of about 125 m/min. and wherein the final drying step comprises the blowing of heated air on the rice at a velocity of about 90 m/min.

8. The process of claim 1 wherein the water and steam sprays are sprayed onto the rice from above and below the rice.

9. A quick cooking rice produced by the process of any one of claims 2, 3, 4, 5, 6, 1, 7 and 8.

* * * * *

UNITED STATES PATENT AND TRADEMARK OFFICE
CERTIFICATE OF CORRECTION

PATENT NO. : 4,385,074
DATED : May 24, 1983
INVENTOR(S) : Bjarne Weibye

It is certified that error appears in the above-identified patent and that said Letters Patent is hereby corrected as shown below:

On the title page, item [73] should read

-- [73] Assignee: A/S Apothekernes Laboratorium for Specialpraeparater, Olso, Norway --.

Signed and Sealed this

Thirteenth Day of May 1986

[SEAL]

*Attest:*

DONALD J. QUIGG

*Attesting Officer*     *Commissioner of Patents and Trademarks*

UNITED STATES PATENT AND TRADEMARK OFFICE
CERTIFICATE OF CORRECTION

PATENT NO. : 4,385,074
DATED : May 24, 1983
INVENTOR(S) : Bjarne Weibye

It is certified that error appears in the above-identified patent and that said Letters Patent is hereby corrected as shown below:

On the title page, item [73] should read

-- [73] Assignee: A/S Apothekernes Laboratorium for Specialpraeparater, Oslo, Norway --.

This certificate supersedes Certificate of Correction issued May Thirteenth, 1986.

Signed and Sealed this

Fifth Day of August 1986

[SEAL]

Attest:

Attesting Officer

DONALD J. QUIGG

Commissioner of Patents and Trademarks